United States Patent [11] 3,556,535

[72] Inventor Ernest J. Chabot
Deerfield Beach, Fla. (1425 17th St. NW Apt. 601, Washington D.C. 20036)
[21] Appl. No. 735,686
[22] Filed June 10, 1968
[45] Patented Jan. 19, 1971

[54] RANDOM ACCESS TAPE LIBRARY
2 Claims, 11 Drawing Figs.

[52] U.S. Cl. 274/4, 179/100.2
[51] Int. Cl. G11b 5/00, G11b 15/66
[50] Field of Search 179/100.2Z; 242/4

[56] References Cited
UNITED STATES PATENTS

| | | | |
|---|---|---|---|
| 3,359,007 | 12/1967 | Perreau | 179/100.2 |
| 3,247,328 | 4/1966 | Mitchell | 179/100.2 |

*Primary Examiner*—J. Russell Goudeau
*Attorneys*—James W. Hiney, Jr. and Fidelman, Wolffe & Leitner

ABSTRACT: A magnetic tape library in which a plurality of tape cartridges are provided, any of which can be selected and moved into driving relation with a common capstan shaft which is rotated to play the selected tape or tapes. Each cartridge has an initial position and a playback position. In a preferred embodiment, an electromagnetic device is provided for each cartridge to move it between these positions. A spring urges the cartridge to one of the positions thereof, and the electromagnetic device works against the spring.

INVENTOR.
ERNEST J. CHABOT
BY John H. Oltman

INVENTOR.
ERNEST J. CHABOT
BY John H. Oltman

INVENTOR.
ERNEST J. CHABOT
BY John H. Oltman

INVENTOR.
ERNEST J. CHABOT
BY John H. Oltman

RANDOM ACCESS TAPE LIBRARY

BACKGROUND OF THE INVENTION

In recent times, tape libraries have been used in language laboratories as an educational aid. Known tape libraries have had some serious drawbacks. For examples, one known type of tape library uses four or more tracks on each tape with one program per track. Three motors are used to operate the tape: one for driving the capstan, one for maintaining tension which also serves as a fast forward drive, and one for fast reverse drive. To provide say 100 programs, 25 tape units are required, thus resulting in 75 motors in the apparatus. Such equipment is expensive, hard to maintain, and involves a large number of moving parts which may wear out relatively quickly. Also, there is a substantial chance that two students will want to listen to some portion of the same tape at the same time, and this chance increases as the number of tracks per tape increases.

SUMMARY OF THE INVENTION

The present invention provides a tape library in which a plurality of tape cartridges of the continuous play type are employed, and individual tapes can be played by selecting and moving one or more cartridges into driving relation with a common capstan operated by a single motor. In a preferred embodiment, each cartridge contains a pinch wheel available to be driven to advance the tape. The cartridges are supported in initial positions in spaced parallel relation with each other and with the pinch wheels thereof in alignment. A common capstan shaft is spaced opposite the wheels. Each cartridge is movable from its initial position to a playback position in which its wheel engages the common capstan and in which a playback head is in "playing" relation to the tape. After the tape is played, the cartridge may be returned to its initial position. A spring urges each cartridge to one of its positions, and an electromagnetic device is provided for each cartridge to move it to the other position. This system requires substantially fewer moving parts than known systems, requires less machining to manufacture it, and is less likely to wear out quickly. The apparatus is easy to clean and maintain. Also, there is less chance that two students will want the same single track tape than will want the same four track tape.

Accordingly, it is an object of the present invention to provide an improved tape library using tape cartridges.

Another object of the invention is to provide a tape library with a plurality of cartridges and a common capstan shaft for all of the cartridges.

A further object of the invention is to provide a tape library in which one or more of a plurality of tape cartridges may be moved into driving relation with a common capstan shaft.

Another object is to provide a playback head for each tape cartridge which is in playing relation with a tape when the cartridge is moved to its playback position.

Still another object of the invention is to provide an electromagnetic device for each cartridge operable to move the cartridge between the playback position and the initial position thereof.

Other objects of this invention will appear in the following description and appended claims, reference being had to the accompanying drawings forming a part of this specification wherein like reference characters designate corresponding parts in the several views.

ON THE DRAWINGS

Figure 1:
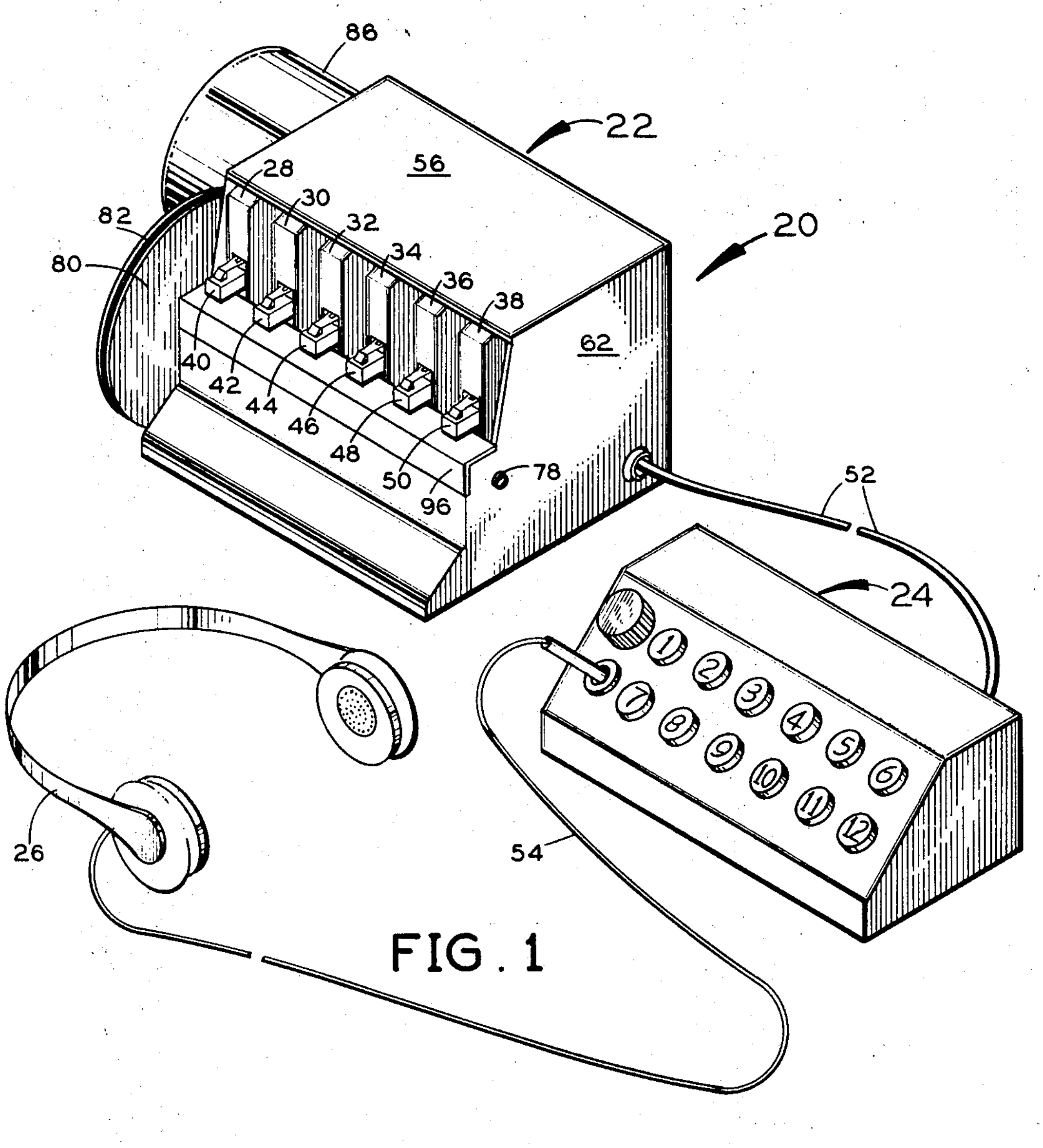
FIG. 1 is a perspective view of a tape library with a combination control panel and amplifier unit and earphones connected thereto.
Figure 2:
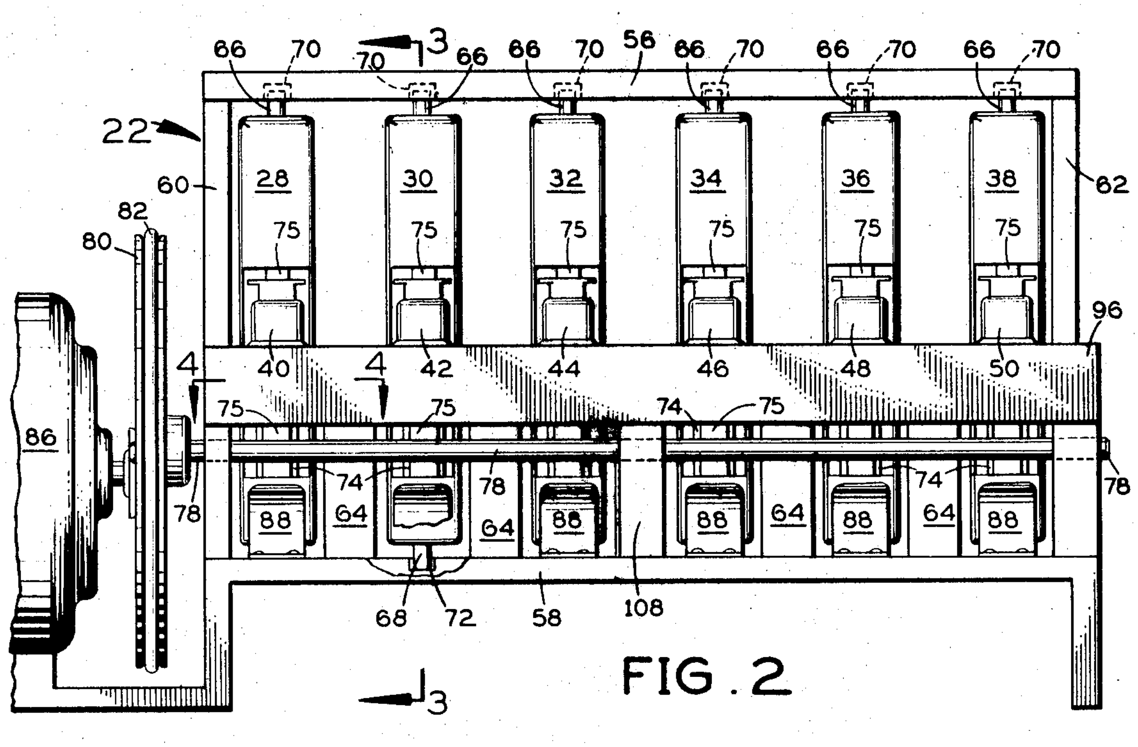
FIG. 2 is an elevation view of the front of the tape library.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

AS SHOWN ON THE DRAWINGS

For purposes of illustration, a tape library 20 of relatively small capacity is shown in the drawings, but it should be understood that a library suitable for handling many tapes can easily be provided using the principles to be described herein. The tape library 20 includes a tape unit 22, a control and amplifier unit 24, and earphones 26. Only one set of earphones 26 is shown herein merely to simplify the drawings, and it should be understood that a set of earphones is to be provided for each listening station. These earphones are connected to circuitry within the control and amplifying unit 24 to enable a student to listen to a program on a tape within the tape unit 22.

The tape unit 22 includes six tape cartridges 28, 30, 32, 34, 36 and 38. In this embodiment, each cartridge contains a single track magnetic tape on which a program has been recorded. The program might be a lesson in a foreign language, a lesson in history, or any other subject, there being no limitation as to the type of program which a may be recorded. The cartridges are of a type in which the tape automatically rewinds as it is played. Cartridges of this type are available commercially, and so will not be described in detail herein.

The tape unit 22 also includes a plurality of pickup heads of the magnetic type, these heads being designated 40, 42, 44, 46, 48 and 50. There is one pickup head for each cartridge, and the arrangement is such that a pickup head is in playback relation with the tape of the corresponding cartridges when that cartridge is moved to a playback position as will be described hereinafter. The pickup heads 40—50 are electrically coupled to the amplifying circuitry within unit 24. Since this circuitry forms no part of the present invention, it will not be described herein.

To select and play a program, a student pushes one of the buttons 1—12 on the unit 24 corresponding to the program he wishes to hear. Only six of these buttons are needed for the six cartridges in tape unit 22, the other buttons being provided to allow expansion of the system to accommodate a larger tape unit or a second tape unit like the tape unit 22. The button which is selected and depressed causes one of the tape cartridges 28—38 to move into a playback position and also causes the tape to be advances so that the program on it is played through the corresponding pickup head. THe student listens to the program on one set of earphones 26. At the end of the tape, a shutoff signal is recorded or otherwise applied to the tape, and control circuitry win within the unit 24 responds to this signal to return the appropriate tape cartridge to its initial nonplaying position. Interconnections between units 22 and 24 are made through a cable or cables 52 and other interconnections between unit 24, and earphones 26 are made through a cable or cables 54. It will be understood that provisions may be made for recording on tapes as well as playing them back.

The construction of a preferred embodiment of a tape unit 22 for a tape library is illustrated in FIGS. 2—8. The cartridges 28—38 are mounted for linear sliding movement between an upper horizontal wall 56 and a lower horizontal wall 58 of a housing which also includes end walls 60 and 62, and partitions 64 between the cartridges. Each cartridge includes a plastic casing, and as shown for example in FIG. 3 each casing has a top flange 66 and a bottom flange 68. These flanges are received within elongated grooves. 70 and 72 respectively in the walls 56 and 58. The grooves 70 and 72 are longer than the flanges 66 and 68 to allow linear sliding movement of the cartridges.

It may be seen that the cartridges 28—38 are supported by walls 56 and 58 in spaced parallel relation with each other. Each cartridge includes a pinch wall wheel 74 which is partially exposed at an opening 76 at the front of the cartridge. The tape 75 passes over the pinch wheel 74 outside the cartridge. In the initial retracted position of the cartridges, the pinch wheels 74 are in alignment with each other. Spaced directly opposite the wheels 74 is a common capstan shaft 78, and this shaft is journaled for rotation in the end walls 60 and 62 of tape unit 22. Capstan shaft 78 is connected at one end to a pulley 80 which also serves as a flywheel and pulley 80 is connected by a belt 82 to another pulley 84 which is driven by an electric motor 86. The speed of the motor 86 and the size of the pulleys 80 and 84 is selected to rotate the capstan shaft 78 at the proper speed for driving the tapes within the cartridges 28—38, the speed of the tape being 17/8 or 33/4 inches per second by way of example.

The wheel 74 of each cartridge serves to advance the tap of that cartridge when it is rotated. The mechanism for winding and unwinding the tape is part of the commercially available cartridges mentioned previously, and so will not be described herein.

Figure 3:
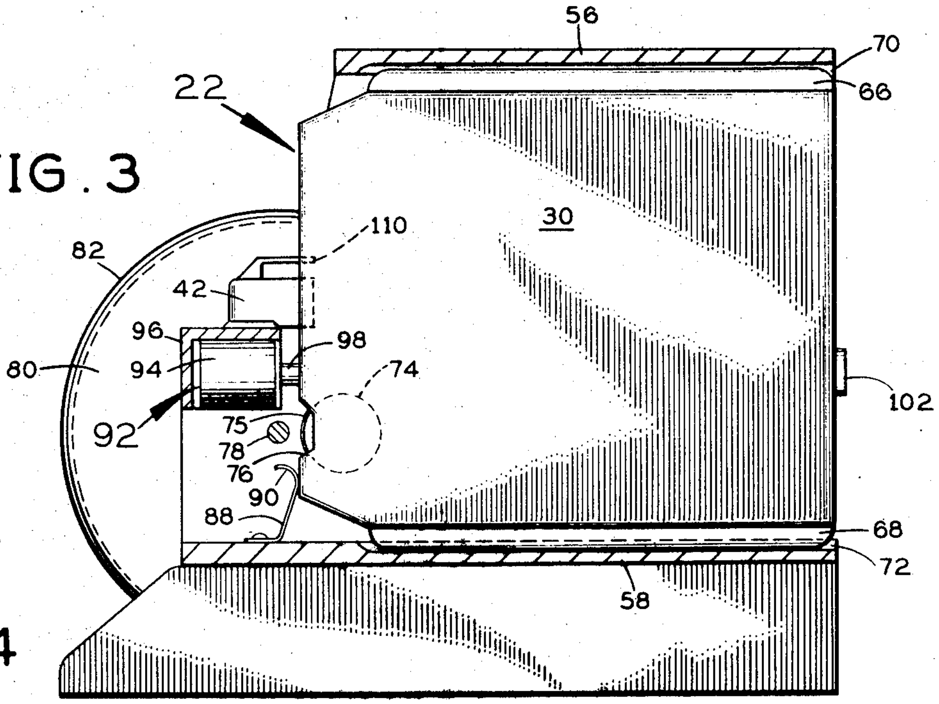
FIG. 3 is a cross sectional view of the tape library taken along line 3–3 of FIG. 2.
Figure 4:
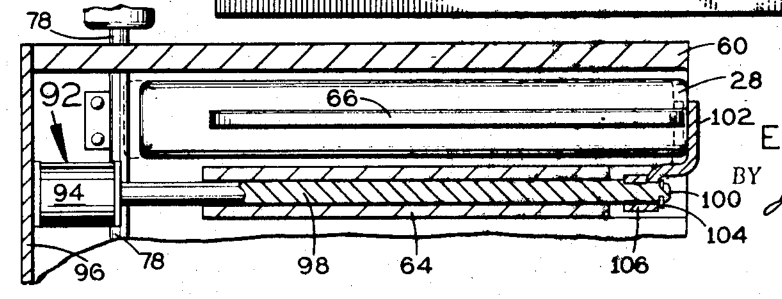
FIG. 4 is a fragmentary top sectional view taken along line 4–4 of FIG. 3.
Figures 8, 9, 10, 11:
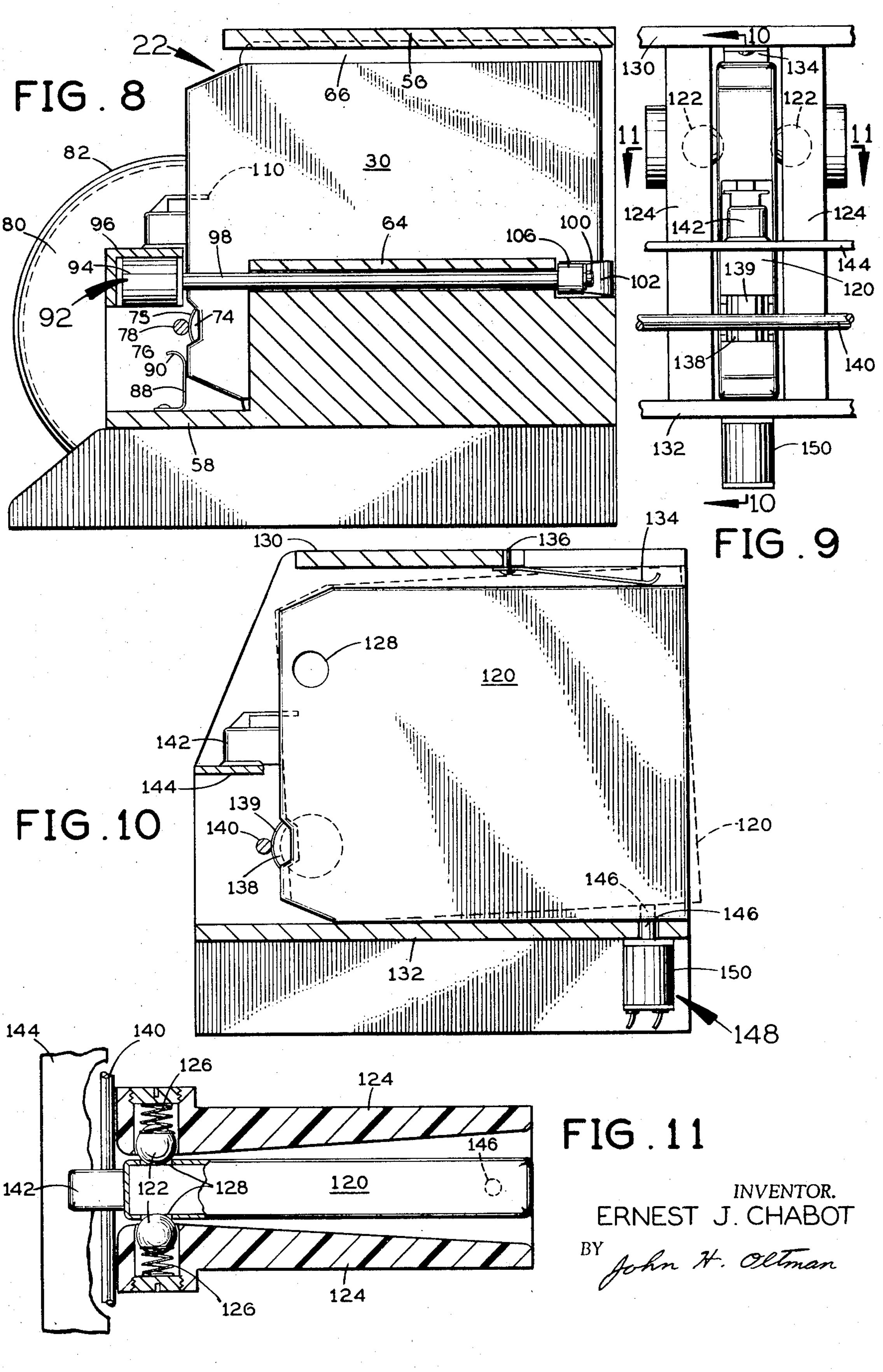
FIG. 8 is a cross-sectional view showing an electromagnetic device for moving one of the cartridges and showing the cartridge in a playback position.
FIG. 9 is a fragmentary plan view showing one cartridge with a pivotal mounting forming another embodiment of the invention.
FIG. 10 is an elevational view, partly in section, showing the pivotal cartridge in a playback position as viewed along line 10–10 of FIG. 9.
FIG. 11 is a cross-sectional view taken along line 11–11 of FIG. 9.

In order to play a given tape, it is necessary to move the selected cartridge from its initial position as shown in FIG. 3 to its playback position as shown in FIG. 8. The two position of a cartridge 28 are also shown in FIG. 4 wherein the cartridge is shown in its initial position as shown in solid lines and its playback position in dashed lines.

Figures 5, 6, 7:
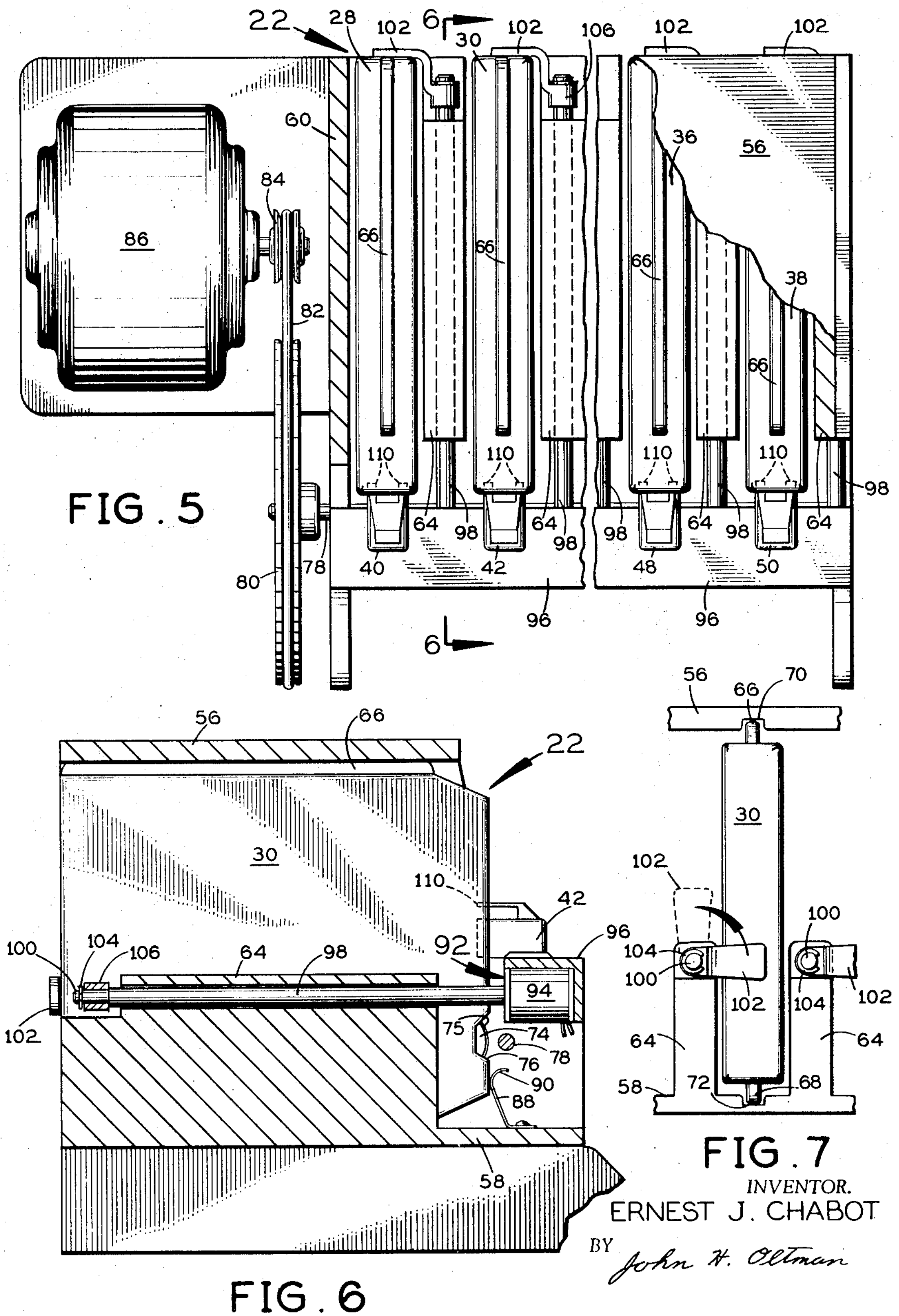
FIG. 5 is a top plan view of the tape library with the cover broken away.
FIG. 6 is a cross-sectional view taken along line 6–6 of FIG. 5.
FIG. 7 is a fragmentary end view from the rear of one cartridge.

THe cartridges are urged toward their initial positions by springs 88, one for each cartridge. In this embodiment the springs 88 are leaf springs having one end affixed to bottom wall 58 as shown in FIGS. 3, 6 and 8, and the other curved end 90 bearing against the front of the respective cartridge such as cartridge 30 shown in FIG. 3. The spring 88 bends to the position shown in FIG. 8 when the cartridge 30 is moved to its playback position, and serves to move the cartridge back to its initial position after the tape has been played.

Each cartridge is provided with an actuator device 92 for moving the cartridge from its initial position to its playback position. As shown in FIGS. 3, 6 and 8, each actuator device 92 includes a solenoid coil 94 mounted under a crossarm 96 in the form of an angle member. The angle member 96 is mounted on the end walls 60 and 62 of tape unit 22. Also included in each actuator device 92 is coupler in the form of a rod 98 which can be moved axially thereof upon energization of the coil 94. The rod 98 may serve as a core for the coil 94, or the rod may be connected to a separate core as desired. In the illustrated embodiment, the rod 98 extends through one of the partitions 64 as shown for example in FIGS. 4, 6 and 8 and terminates at an end portion 100 located in a cutout in partition 64.

Referring to FIGS. 6 and 7, it may be seen that a rotatable finger 102 is connected to the end 100 of rod 98 by means of a split washer 104. Finger 102 has a hub portion 106 through which the rod's reduced end 100 extends. Finger 102 is shown in a lower position in FIG. 7 wherein it contacts the rear end of a cartridge 30, and as indicated by dashed lines in this view, the finger 102 may be raised to an upright position wherein it clears the cartridge so that the cartridge can be removed from the rear of the tape unit 22. When rod 98 is pulled forward by energization by coil 94, its forward movement is stopped when hub 106 butts against the top of partition 64 as shown in FIG. 8. Of course, the coil 94 is energized when the appropriate button of unit 24 is pushed. The motor 86 could drive shaft 78 continuously, or it could be started when any of the buttons are depressed. The shaft 78 is preferably supported by an intermediate block 108 (FIG. 2) to minimize throwout of the shaft.

The pickup heads 40—50 are mounted on the top of angle member 96 as shown particularly in FIG. 3. The pickup head extends into the cartridge 30 (FIG. 3) so as to couple to the magnetic tape within the cartridge. There may be guide fingers 110 on each pickup head for guiding the tape, (see particularly FIG. 5).

Another embodiment of the invention is shown in FIGS. 9, 10 and 11. In this embodiment, each cartridge 120 is pivotally mounted on balls 122 which are in turn mounted in partitions 124 on opposite sides of each cartridge (see FIGS. 9 and 11). As shown in FIG. 11, the balls 122 are urged outwardly from recesses in the partitions 124 by springs 126, and the balls 122 enter holes 128 provided in the sides of the cartridge 120.

The cartridge 120 is mounted between horizontal walls 130 and 132, and the cartridges 120 is urged in a clockwise direction by a spring 134 bearing against the top of the cartridge and fastened to the top wall 130 by a fastener 136. The cartridge 120 is shown in its playback position in FIG. 10 wherein the wheel 138 contacts the common capstan shaft 140. The tape 139 is pinched between the capstan 140 and wheel 138. The pickup head 142 mounted on crossarm 144 is in playback relation with the tape within the cartridge.

The cartridge 120 is normally in an initial position indicated in dashed lines in FIG. 10 wherein the wheel 138 is spaced from capstan 140. The cartridge 120 is pushed to this initial position by a coupler 146 of a solenoid device 148 having a coil 150 for operating the coupler 146. The coupler 146 may be spring biased to overcome spring 134 and urge cartridge 120 counterclockwise to its initial position. When coil 150 is energized by depressing one of the control buttons as previously described, coupler 146 is retracted so that spring 134 pushes the cartridge to its playback position. Wheel 138 contacts shaft 140 so that the tape is advanced and the program is picked up by the head 142. At the end of the tape, a signal causes coil 150 to be deenergized, thus allowing coupler 146 to rise to push cartridge 120 to its initial position.

The embodiment of FIGS. 9—11 has been simplified, and it will be understood that several cartridges, pickup heads and actuator devices are provided in the same manner as has been described in connection with FIGS. 2—8.

The invention thus provides a tape library which, by the use of a common capstan for driving individual tape cartridges, employs relatively few moving parts and only one drive motor. The tape unit can be constructed economically, can be maintained easily, and should have long useful life.

I claim:

1. A magnetic tape apparatus for housing a multiplicity of tape cartridges of which any number can be selectively played, said apparatus comprising a plurality of magnetic tape cartridges each having a tape and a pinch wheel adapted to be driven to advance the respective tapes, housing means supporting said cartridges in an initial position in spaced parallel relation to each other and with said wheels thereof in alignment with each other, said housing means including partitions between each cartridge, slot means on said housing means and flanges on said cartridges adapted to allow linear sliding movement of said cartridges into a playback position, a common capstan shaft mounted for rotation on said housing means and spaced opposite said wheels to be engaged by any of said wheels upon movement of a cartridge to said playback position, power means for rotating said capstan shaft as at a speed adapted to play any number of said tapes, a plurality of electromagnetic solenoids mounted on said housing, the number of solenoids corresponding to the number of cartridges, said solenoids having actuator rods and coil means adapted to linearly move said actuator rods, said actuator rod passing through said partitions and having a terminal portion extending free of said partitions, hubs mounted for rotative movement on said terminal portions, said hubs having a finger engaging the rear of said cartridges when in their initial position and adapted to be rotated to allow said cartridges to be easily removed, said hubs being located on said terminal portion so as to allow said rods to slide upon actuation only an amount sufficient to allow said wheels to engage said capstan shaft, a plurality of playback heads respectively engageable with a tape upon movement of the corresponding cartridge to said playback position, said housing means being open on the side opposite said capstan shaft to allow for quick and easy removal of said cartridges, and spring means associated with each cartridge and said housing and are resiliently urging said cartridges against said hub fingers into said initial position.

2. A magnetic tape library apparatus for housing a multiplicity of tape cartridges of which any number can be selectively played, said apparatus comprising a plurality of magnetic tape cartridges each having a tape and a pinch wheel adapted to be driven to advance the respective tapes, housing means supporting said cartridges in an initial position in spaced parallel relation to each other and with said wheels thereof in alignment with each other, said housing means including partitions between each cartridge, aligned aperture means in each partition facing said cartridges, spring biased ball means in each said aperture and held therein by the configuration of said aperture means, recesses on opposite sides of each cartridge receiving said ball means and adapted to allow pivoting of said cartridges into a playback position, a common capstan shaft mounted for rotation on said housing means and spaced opposite said wheels to be engaged by any of said wheels upon rotation of a cartridge to said playback position, power means for rotating said capstan shaft at a speed adapted to play any number of said tapes, a plurality of electromagnetic solenoids mounted beneath the base of said housing, the number of solenoids corresponding to the number of cartridges, said solenoids having actuator rods and coil means adapted to vertically move said actuator rods, said actuator rods passing through the base of said housing and having a terminal portion extending free of said base and into engagement with the base of said cartridges, a plurality of playback heads respectively engageable with a tape upon rotative movement of the corresponding cartridge to said playback position, said housing means being open on the side opposite said capstan shaft to allow for quick and easy removal of said cartridges, and a first spring means normally biasing said actuator rods away from said coils to maintain said cartridges in said initial position; a second spring means located above said cartridge means on said housing and resiliently urging said cartridges into playback position, the energization of said solenoids urging said actuator rods downwardly and being sufficient to overcome the force of said first spring means.